US007005820B2

(12) United States Patent
Tanner

(10) Patent No.: US 7,005,820 B2
(45) Date of Patent: Feb. 28, 2006

(54) APPARATUS FOR SPINDLE BEARING FRICTION ESTIMATION FOR RELIABLE DISK DRIVE STARTUP

(75) Inventor: Brian K. Tanner, San Jose, CA (US)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/629,402

(22) Filed: Jul. 28, 2003

(65) Prior Publication Data

US 2004/0124799 A1   Jul. 1, 2004

Related U.S. Application Data

(60) Provisional application No. 60/436,750, filed on Dec. 27, 2002.

(51) Int. Cl.
  *G05D 23/00* (2006.01)
  *H02H 5/04* (2006.01)
(52) U.S. Cl. .................. 318/471; 318/473; 388/934; 361/25
(58) Field of Classification Search .............. 700/153, 700/202, 299, 205, 278; 318/471; 360/97.02; 369/13.46, 13.51
  See application file for complete search history.

(56) References Cited

U.S. PATENT DOCUMENTS

| | | | | |
|---|---|---|---|---|
| 5,204,593 A | * | 4/1993 | Ueki | 318/254 |
| 5,268,804 A | * | 12/1993 | Wallis | 360/78.04 |
| 5,936,788 A | | 8/1999 | Boutaghou et al. | 360/75 |
| 6,055,120 A | | 4/2000 | Schirle | 360/73.03 |
| 6,061,198 A | | 5/2000 | Shrinkle | 360/75 |
| 6,078,158 A | * | 6/2000 | Heeren et al. | 318/430 |
| 6,088,662 A | * | 7/2000 | Flinsbaugh et al. | 702/132 |
| 6,266,203 B1 | * | 7/2001 | Street et al. | 360/69 |
| 6,342,985 B1 | * | 1/2002 | Clare et al. | 360/75 |
| 6,369,972 B1 | * | 4/2002 | Codilian et al. | 360/78.04 |
| 6,369,973 B1 | * | 4/2002 | Mushika et al. | 360/78.07 |
| 6,392,833 B1 | * | 5/2002 | Wood et al. | 360/73.03 |
| 6,493,169 B1 | | 12/2002 | Ferris et al. | 360/73.03 |
| 6,594,106 B1 | * | 7/2003 | Serrano et al. | 360/78.09 |
| 6,731,450 B1 | * | 5/2004 | Codilian et al. | 360/69 |
| 6,744,586 B1 | * | 6/2004 | Ukani et al. | 360/69 |
| 6,754,035 B1 | * | 6/2004 | Francis et al. | 360/78.06 |
| 6,876,606 B1 | * | 4/2005 | Kajino et al. | 369/44.27 |
| 6,937,427 B1 | * | 8/2005 | Tan et al. | 360/78.04 |

(Continued)

FOREIGN PATENT DOCUMENTS

JP    05120859 A  *  5/1993

(Continued)

*Primary Examiner*—Marlon T. Fletcher
*Assistant Examiner*—Patrick Miller
(74) *Attorney, Agent, or Firm*—Fliesler Meyer LLP

(57) ABSTRACT

Temperature of the disk drive is measured using components of the disk drive without the need of including a separate temperature sensor to optimize performance of the spindle motor during startup. To measure temperature, the resistance of the VCM winding is measured and used to estimate the spindle bearing temperature. Back emf is measured from VCM windings and used during startup to accurately determine actuator position. Because the VCM coil resistance varies significantly with temperature, coil resistance variations with temperature are determined to enable compensation for inaccuracies in determination of actuator velocity. This inferred temperature is then used to optimize the start up procedure for the spindle motor to accommodate the increased frictional loading of the spindle bearing. In this way an improved performance in the reliability and spin up operation time can be realized without the addition of a separate temperature measurement hardware element.

10 Claims, 2 Drawing Sheets

U.S. PATENT DOCUMENTS

2001/0055231 A1 * 12/2001 Tsuruta ........................ 365/202
2003/0179486 A1 * 9/2003 Ho et al. ....................... 360/71
2003/0202274 A1 * 10/2003 Onda et al. .................... 360/69
2004/0124799 A1 * 7/2004 Tanner ........................ 318/471

FOREIGN PATENT DOCUMENTS

JP        2000222815 A  *  8/2000

* cited by examiner

APPARATUS FOR SPINDLE BEARING FRICTION ESTIMATION FOR RELIABLE DISK DRIVE STARTUP

PRIOITY CLAIM TO PROVISIONAL APPLICATION

This patent application claims priority to U.S. Provisional Patent Application No. 60/436,750, filed Dec. 27, 2002.

BACKGROUND

1. Technical Field

The present invention relates to a method for starting a brushless DC spindle motor in a hard disk drive memory subsystem, and more particularly to starting the spindle motor in the presence of varying ambient temperatures.

2. Related Art

A hard disk drive typically includes one or more rotatable storage media, or disks upon which data is encoded. The disks are mounted on the shaft of a spindle motor for rotation. Data is encoded on the rotating disks as bits of information using magnetic field reversals grouped in tracks. A transducer head supported by an actuator arm is used to read data from or write data to the disks. A voice control motor (VCM) attached to the actuator arm controls positioning of the actuator, and thus the transducer head position over a disk. Servo position data read from the disk is processed by the processor, enabling the processor to provide servo control signals to the VCM for proper positioning of a transducer head relative to a disk.

Temperature changes during startup can significantly affect components of the disk drive. The operating temperature of a drive can be up to 50 degrees Celsius higher than the drive when it first starts at room temperature. In particular, low temperatures at startup of the drive will significantly affect run-up of the spindle motor. Oil bearing spindles, or other hydrodynamic spindle motors, have increased drag torque at low temperatures, primarily due to increased viscosity of the bearing fluid. The increased drag is most significant for hydrodynamic bearing spindles, which may be used in very high speed hard disk drives, such as drives that operate at 10,000 revolutions per minute (rpm).

A specific disadvantage is that the increased drag of the spindle bearing at low temperature start conditions may be so high that the spindle does not come up to speed in a desired time. For a 10,000 rpm, hydrodynamic bearing spindle, the difference in power due to additional bearing drag can be 1.0 Watt between 10° C. and 25° C. This corresponds to a significant difference in drag torque. A spindle motor with a torque constant based upon this worst case start condition may significantly compromise the motor at nominal operating conditions. The increased drag at low temperature starts would demand a lower torque constant to meet necessary voltage headroom conditions. A typical design practice is to reduce the motor torque constant just enough to allow spindle motor spin-up within a desired time, while allowing sufficient voltage headroom for adequate speed control.

The spindle motor bearings in typical disk drive spindle motors are located very close to the motor windings. The motor windings are the most significant source of heat in a motor. Thus, as the motor starts, the bearings heat up and increase in temperature. The bearing drag torque is a function primarily of the viscosity of the bearing grease base oil and of the stiffness of the grease, both of which reduce with increased temperature. So the bearing drag torque reduces with time shortly after the motor starts spinning due to the heating of the bearings. By allowing more time to spin up to speed before closed loop motor control takes over, the bearing drag can be reduced.

An error checking procedure for the proper operation of disk drives, primarily magnetic disk drives, is to conduct a "time out test" at the start-up of the disk drive. In a time out test, if the disk drive does not reach full operational speed within the time out or specified period, it is deemed an error. Often, a spindle motor controller sends an error signal if the spindle motor cannot come up to speed during the time out period and the drive is turned off.

SUMMARY

In accordance with the present invention, a method of measuring temperature of the disk drive and use of the temperature to control spin-up of the spindle motor is provided using components of the disk drive without the need of installing a separate temperature sensor.

To determine temperature, the resistance of the VCM coil winding is measured and used to estimate the spindle bearing temperature. Back emf measurements determined from VCM coil winding are typically used during startup to accurately determine actuator velocity and position. Because the VCM coil resistance varies significantly with temperature, coil resistance variations with temperature are determined to enable compensation. The tabulated temperatures are in turn used, in accordance with the present invention, to infer temperature of the drive during startup. This inferred temperature is then used to optimize the start procedures for the spindle motor to accommodate the increased frictional loading of the spindle bearing. In this way an improved performance in the reliability and spin up operation time can be realized without the addition of a separate temperature measurement hardware element.

BRIEF DESCRIPTION OF THE DRAWINGS

Further details of the present invention are explained with the help of the attached drawings in which.

DETAILED DESCRIPTION

Figure 1:
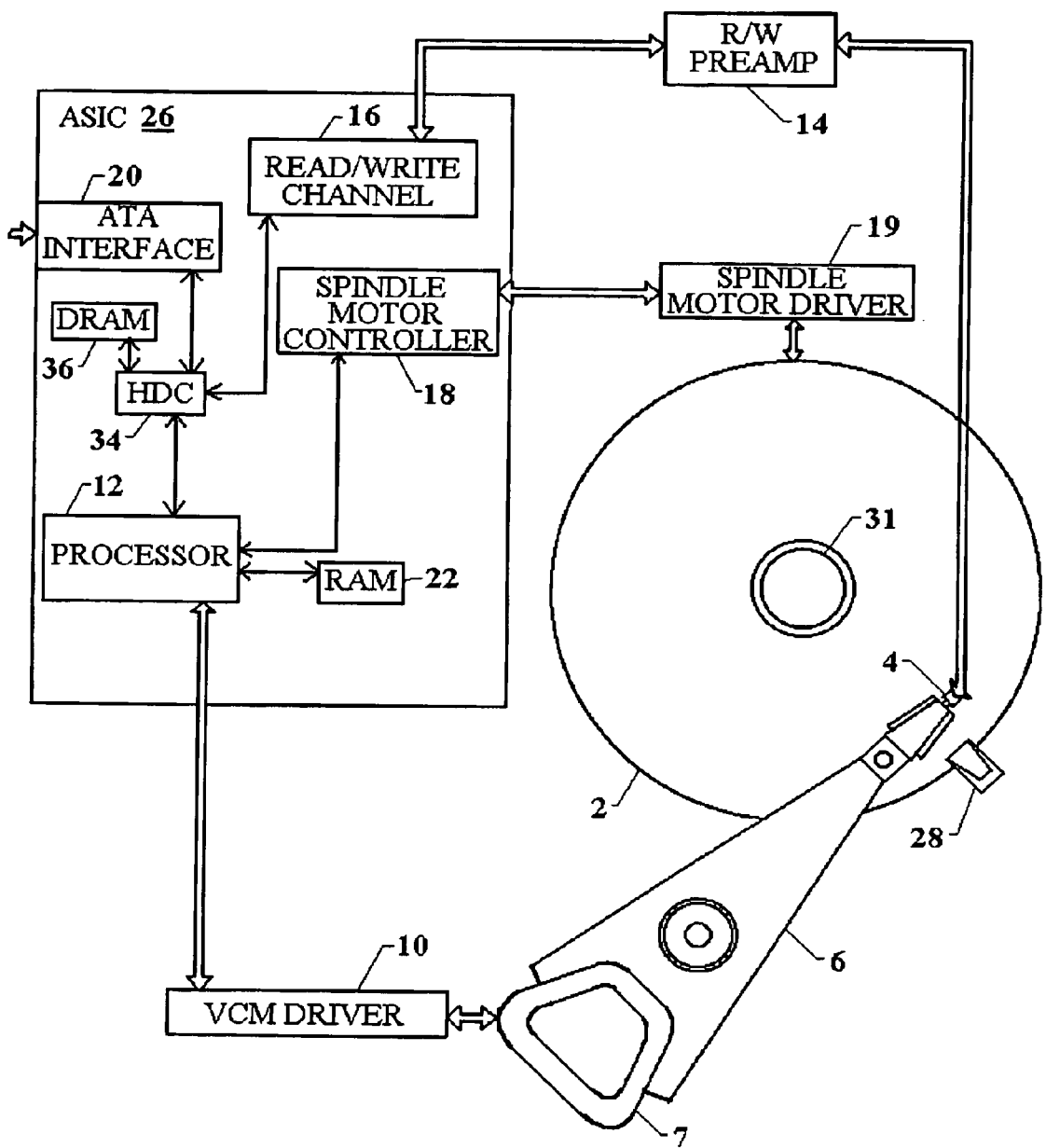
FIG. 1 shows a block diagram of components of a hard disk drive configured to provide a disk drive temperature estimation during start-up based on measured resistance of the VCM coil.

FIG. 1 shows a block diagram of components of a hard disk drive system configured to provide a disk drive temperature estimation during start-up. The hard disk drive includes a rotating disk 2 containing a magnetic medium for storing data in defined tracks. Data is written to or read from the disk 2 using a transducer or read/write head 4 provided on an actuator 6. Actuator movement is controlled by a voice control motor (VCM) 7 made up of a coil configured for receiving an external signal, and a rotor magnet.

Current is provided to the coil of the VCM 7 using a VCM driver 10. Details of the VCM driver 10 and VCM 7 are described subsequently with respect to FIG. 3. The VCM driver 10 in turn receives positioning command signals from a processor 12 to control the amount of current applied to achieve a desired movement of actuator 7.

To control the actuator 6 using a closed loop servo control technique, the processor 12 receives data from the rotating disk 2. The data is read from or written to the rotating disk 2 using the transducer head 4. The analog data read is provided through a read/write (R/W) pre-amplifier 14. The amplified read data is provided to the R/W channel 16, which includes circuitry to convert the data from analog to digital and decode the digital data to provide to the hard disk controller (HDC) 34. The R/W channel 16 further converts data received from the HDC to be written from digital to analog for providing through the R/W preamp 14 to transducer head 4. The data read includes servo data provided in digital form from the HDC 34 to the processor 12.

Servo data provided to the processor 12 includes information indicating track positioning of the transducer head 4 over the rotating disk 2. The processor 12 determines track mis-registration (TMR) and creates a servo positioning control command signal for providing to VCM driver 10 to correct for the TMR. Also, if it is desired to read data from or write data to other tracks on the rotating disk 4, the processor 12 creates servo positioning control commands for providing to VCM driver 10 to enable the transducer head 4 to move from the current track to the desired track.

The processor 12 can provide control commands to a spindle motor controller 18 to control the operation speed of the spindle motor. The spindle motor controller 18 in turn provides control signals to the spindle motor driver 19, which in response applies voltages to the windings of the spindle motor to cause the desired motor speed. The spindle motor driver 19 is described in more detail subsequently with respect to FIG. 3.

Processor 12 executes instructions acquired from a stored control program to control disk drive functions. During startup, the control program is embedded in flash memory, or other non-volatile memory and then either executed directly, or loaded into a random access memory RAM 22 connected to the processor 12 and executed. Various firmware routines are stored in memory locations for controlling the operation of the actuator 7 and spindle motor 30. Here, control programs include the instructions the processor 12 executes, and tables, parameters or arguments used during the execution of these programs.

The processor 12 also communicates with the HDC 34 which has access to components external to the hard disk drive system through an advanced technology attachment (ATA) interface bus 20. The ATA bus 20 is also referred to as an integrated drive electronics (IDE) bus, and although specifically shown as an ATA bus, may be another type of external component interface in accordance with the present invention. The HDC 34 further provides access to additional DRAM memory 36. Control programs for the processor may reside in DRAM 36, or in RAM 22 directly accessible by the processor 12.

For a hard disk drive, application specific integration circuits (ASICs) have been created to integrate a number of circuit components onto a single chip. One such ASIC 26 is illustrated in FIG. 1. As shown, the ASIC 26 integrates the processor 12, RAM 22, R/W channel 16, spindle motor controller 18, HDC 34, DRAM 36, and ATA interface bus 20 all onto a single chip. The chip for disk drive control is typically referred to as a system on a chip (SOC).

Although shown as separate components, the VCM driver 11 and spindle motor driver 19 can be combined into a single "hard disk controller". The processor 12 is shown as a single unit directly communicating with the VCM driver 10, although a separate VCM controller processor may be used in conjunction with processor 12 to control the VCM driver 10. Further, although spindle motor controller 18 is shown as a separate processor from processor 12, it is understood that the spindle motor controller 18 may be combined into the processor 12.

Figure 2:
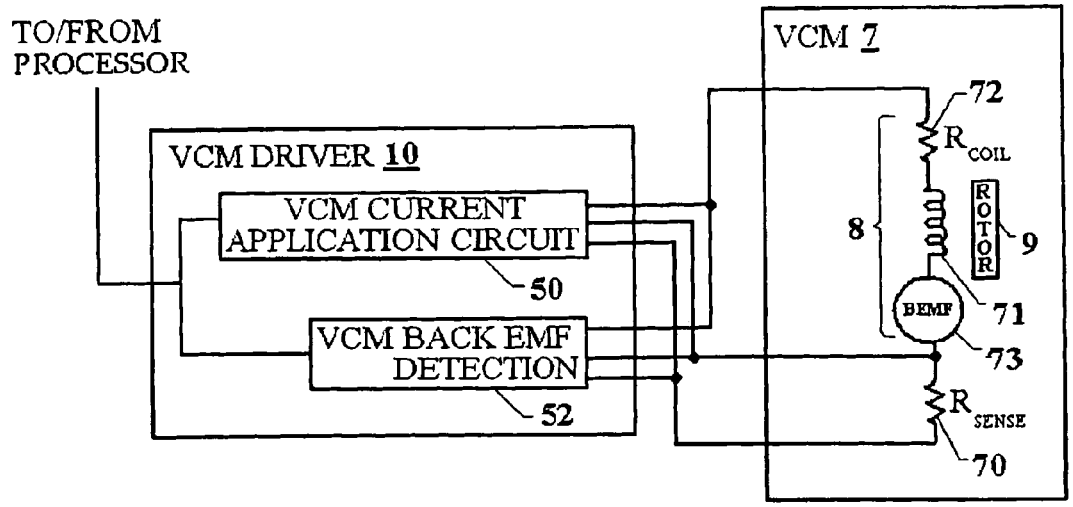
FIG. 2 shows details of the VCM driver of FIG. 1.

FIG. 2 shows details of the VCM driver 11 of FIG. 1 as connected to the VCM 7. As shown, the VCM driver 11 includes a VCM current application circuit 50, which applies current to the coil 8 of the VCM 7 with a duration and magnitude controlled based on a signal received from the VCM driver 10. The coil 8 is modeled in FIG. 3 to include a coil inductance 71, a coil resistance 72 and a back emf voltage generator 73. Current provided through the coil 71 controls movement of the rotor 9, and likewise movement of the rotor generates a back emf voltage in voltage generator 73.

The VCM driver 10 further includes a back emf detection circuit 52 for sensing the velocity of the actuator based on current received by a sense resistor 70 in the VCM 7. The open-circuit voltage of the VCM is estimated by observation of the actual VCM voltage and the VCM current (either the commanded current or the sensed current, sensed using a series resistor 70), and multiplication of the current by an estimated VCM coil resistance and subtraction of that amount from the measured coil voltage.

During startup, actuator velocity is determined using measurements from the VCM back emf detection circuit 52. To monitor the actuator velocity, back emf voltage across the coil 8 of the VCM 7 is monitored as part of the voltage of the actuator. Back emf varies as a function of the velocity of the actuator coil through the magnetic field produced by the magnet 9 of the VCM 7 and as a function of the velocity of the actuator 6 down the ramp 28. Servo indications on the disk can be read when a spindle motor normal operation speed is obtained after spin-up.

The current application circuit 50 can function as a processor to determine the appropriate amount of current to apply to windings of the VCM 7 to achieve a desired movement, or simply as a circuit to apply voltages with processing performed by processor 12. With current application circuit 50 acting as a processor, feedback from the back emf detection circuit 52 is provided to the current application circuit 50 to enable a determination of actuator movement during startup, and appropriate current to apply to achieve a desired actuator movement. The main processor 12 only functions to send control codes to indicate movement should occur to a desired position. With the current application circuit limited to circuitry for applying voltages, and all processing performed by processor 12, a feedback signal from the VCM back emf detection circuit 52 will be provided to the processor 12 to enable the processor 12 to determine actuator velocity at startup and apply appropriate control signals to the VCM current application circuit to achieve a desired actuator movement.

As indicated previously, during shut down, the actuator 6 is positioned on a ramp 28 situated off to the side of a disk 2 to prevent contact between the transducer head 4 and disk 2. During startup, actuator velocity down the ramp 28 is controlled using measurements from the VCM back emf detection circuit 52 so that the slider of transducer 4 flies when it gets to the bottom of the ramp 28 and does not contact the disk 2. The slider has an air bearing surface that causes the transducer to fly above the data tracks of the disk surface due to fluid currents caused by the spindle motor rotating the disk. Thus, the transducer 4 does not physically contact the disk surface 2 during normal operation of the disk drive to minimize wear at both the head 4 and disk surface 2. With contact of the transducer head 4 and disk surface 2 undesirable, a critical time during operation of a disk drive is just before the disk drive shuts down. When shutting down a disk drive, the actuator 6 is moved so that the transducer 4 does not land on the portion of the disk that contains data. How this is actually accomplished depends on the design of the drive.

Typically during shut down, the actuator 6 is positioned on a ramp 28 situated off to the side of a disk 2. A portion of the ramp 28 is positioned over the disk 2 itself. In operation, before power is actually shut off, the actuator 6 assembly slides up the ramp 28 to a park position at the top of the ramp 28 so that the transducer 4 does not contact the disk 2. This procedure is known as unloading the heads.

Temperature changes during startup can significantly affect calculations of actuator velocity based on back emf. The voltage of the actuator motor varies with the temperature of the permanent magnet 9 and the resistance of the coil 8 in the VCM 7. With operating temperature of a drive up to 50 degrees Celsius higher than the drive temperature when it first starts, a resulting change in back emf can be as much as 10–15%. Variations of coil resistance with temperature may thus be determined to correct for variations in measured voltage of the actuator motor to estimate the back emf voltage. Since, the material and length of coil 8 are known, its resistance variation with temperature is readily determined.

Processor 12 executes instructions acquired from a stored control program to control disk drive functions. During startup, the control program is embedded in flash memory, or other non-volatile memory and then either executed directly, or loaded into RAM 22 and executed. During startup, the control program causes the processor 12 to measure the back emf from the VCM coil winding 8 to determine velocity of the actuator. In accordance with the present invention, the control program further causes the processor 12 to measure either a resulting voltage or current return from VCM coil 8 during the back emf measurement using the VCM back emf circuit 52 to determine a resistance R of the coil 8 based on the formula $V = I \times R$, where I is current and V is voltage across the coil 8. The resistance measured can be the resistance of the coil 72, or in other embodiments the resistance of sense resistor 70 or a combination of resistances 70 and 72. The control program then either accesses a table of values to determine drive temperature based on the value R, or simply make a calculation to determine drive temperature based on the known length, size, and material of the coil 8. The temperature measurement is then used to correct the determination of actuator velocity based on back emf measurement, as well as to optimize spin up of the spindle motor.

Figure 3:
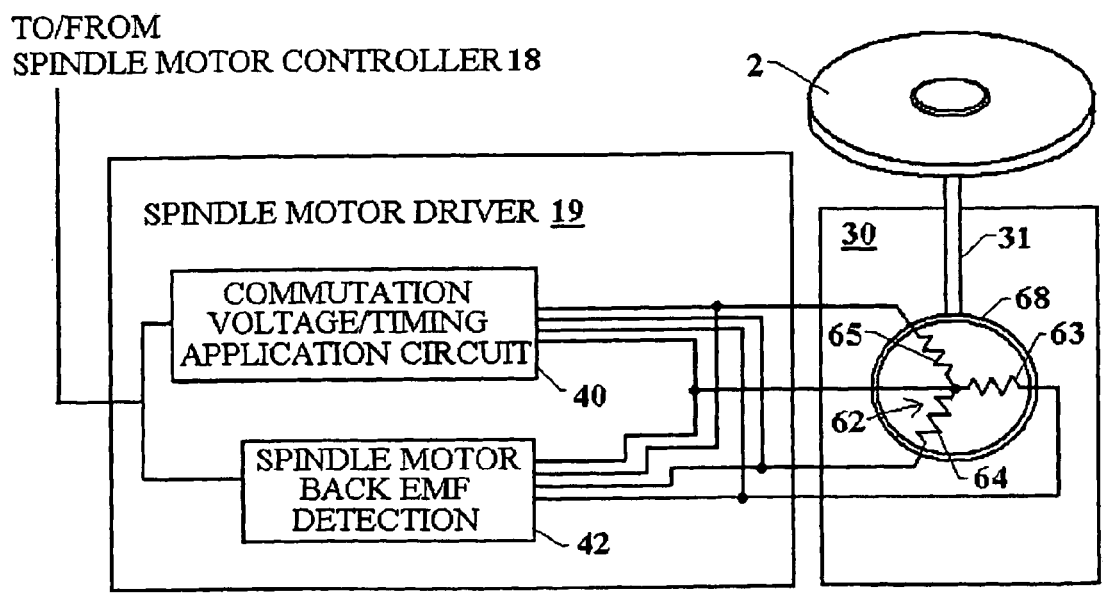
FIG. 3 shows details of the spindle motor, along with further details of the spindle motor driver circuit shown in FIG. 1.

FIG. 3 shows details of the spindle motor 30 including coils 62 and rotor 68. Also shown are more details of the spindle motor driver circuit 19 as shown in block diagram in FIG. 1. The spindle motor 30 includes three windings 63, 64 and 65 electrically arranged in a Y configuration. A rotor 68 supports rotor shaft 31 of the spindle motor 30 and has magnets that provide a permanent magnetic field. The spindle motor 30 generates torque on rotor 68 when current flows through at least one of the windings 63–65. The torque depends upon the magnitude and direction of current flow through the windings 63–65, and the angular position of rotor 65 relative to windings 63–65. The functional relationship between torque and current flow and angular position is commonly determined corresponding to a respective one of a series of commutation states.

Spindle motor driver 19 supplies current to windings 63–65 to cause rotor 38 to rotate at an operating spin-rate during the operation mode of the disk drive. Spindle motor driver 19 includes a commutation circuit 40 to apply different commutation state currents at different clock times. Commutation circuit 40 provides a sequence of commutation states by applying a voltage +V across a selected combination of windings 63–65 to generate a torque on rotor 68 in order to maintain the operating spin-rate of rotor 68.

The commutation circuit 40 clocks a series of commutation clock pulses applied to windings 63–65 to advance commutation state from a present commutation state to a next commutation state. The series of commutation clock pulses have a corresponding series of commutation clock periods. The commutation clock periods have a systematically introduced variation from a nominal commutation clock period that depends on the operating spin-rate of rotor 68.

Processor 12 executes instructions acquired from a stored control program to control disk drive functions. These functions include starting up and controlling the speed of spindle motor 30 via spindle motor controller 19 and numerous other disk drive functions. Spindle motor controller 19 is connected to processor 12 to permit processor 12 to directly communicate with spindle motor driver 19.

Processor 12 suitably includes a flash memory, or other embedded non-volatile memory that stores control programs it uses during startup. Various firmware routines are stored in memory locations for controlling the operation of spindle motor 30. Here, control programs include the instructions the processor 12 executes, and tables, parameters or arguments used during the execution of these programs. Processor control programs may also reside in RAM 22, or memory over ATA bus 20.

Spindle motor controller 18 includes a control circuitry to command spindle motor driver 19 to apply a current through at least one winding of windings 63–65 to cause rotor 68 to rotate. The spindle controller 18 executing a speed controller routine controls the current through windings 63–65 in order to maintain the operating spin-rate of rotor 68 in response to back emf signals received from back emf detection circuit 42 in the spindle motor driver 19. The spindle motor controller 19 monitors the time period between back emf zero crossings and provides this time period information to enable determination of the speed of spindle motor 68. The speed indication is then used to control the current through windings 63–65 to accomplish a desired speed.

Spindle motor controller 18 also controls speed using a series of commutation clock pulses to be provided from the commutation circuit 40 of the spindle motor driver 19 to advance commutation state sequence from a present commutation state to a next commutation state in the commutation state sequence.

During the operation mode of the disk drive, the commutation states proceed through a sequence of six commutation states corresponding to a set of torque values to maximize the peak positive torque produced by spindle motor 30. For each of the commutation states, a voltage +V is applied across a combination of at least two of the windings 63–65.

The spindle motor controller 18 serves as a speed controller to control the spin-rate of spindle motor 30 to maintain a substantially constant spin-rate of disk 2. Commutation state sequences are provided as controlled by the spindle controller 19 from the commutation circuit 40 during the operation mode in response to commutation clock pulses from the spindle motor controller 18 so that a desired torque is generated for rotor 68 of spindle motor 30.

Although the spindle motor driver 19 and spindle motor controller 18 are disclosed as separate items, the processing performed can be combined into the commutation voltage/timing application circuit 40 to form one device. With such a combination, spindle motor back emf detection circuit 42 will provide a signal directly to the commutation circuit 40 to enable determination of commutation currents needed to achieve a desired speed. With spindle motor controller 18 and driver 19 separated, the spindle motor back emf detection circuit 42 output will go to the spindle motor controller 18.

In accordance with the present invention, the temperature determined from the resistance of the coil windings can be used to optimize spindle motor performance during startup in a number of ways. In a first embodiment, the time-out time period for the spindle motor is extended as temperature is reduced. As indicated above, the time-out period is set to give the spindle motor adequate time to spin-up and reach a desired operation spin rate. If the time-out period is exceeded, a signal is sent from the processor 12 to the spindle motor controller 18 to cause the spindle motor 30 to shut down to prevent damage. With bearing friction significantly increasing with reduced temperature, spin-up time likewise will be significantly increased. Increased time-out periods are set corresponding to decreasing temperatures and stored in the start up code accessible by the processor 12. Thus, upon startup the processor will determine temperature from the VCM coil 8, and then set the time-out period for the spindle motor 30 accordingly.

In another embodiment, the voltage applied to coil windings 63–65 of the spindle motor 30 are increased to generate additional torque during the alignment step and the run up of the startup operation as temperature is reduced. As indicated above, the magnitude of the voltage applied to the coil windings 63–65 is related to the amount of torque generated by the spindle motor 30. With bearing friction significantly increasing with temperature, spin-up time can be minimized by increasing the torque applied corresponding to a reduction in temperature. Thus, upon startup, the processor will determine temperature from the spindle coil resistance, and then control the spindle controller 18 to set the initial voltage values to increase torque based on the drive temperature for the alignment step and the subsequent run up step. Since the spindle motor 30 heats up within a matter or minutes, the voltages applied can then be reduced to level used during normal operation temperatures to prevent damage to the spindle motor.

In an additional embodiment, current magnitude applied to the spindle motor windings is monitored and current is increased to increase torque when temperature levels decrease. Current applied to the spindle motor windings is then increased as temperature levels rise.

In a further embodiment, the commutation state sequence timing is controlled to increase torque during startup as temperature is reduced. As indicated, a series of commutation clock pulses are provided to control application of voltages to the coil windings 63–65. Upon startup, the processor can determine temperature from the resistance of the spindle coil windings 63–65, and then control the spindle controller 18 to set the initial commutation states to generate a torque with increasing value based on reduced drive temperature. As with control of the magnitude of the currents, the commutation clock pulses are altered to increase torque initially upon startup with cold temperatures, but with the spindle motor 30 heating up to a normal operating temperature within a matter of minutes, the commutation clock pulse periods are returned to normal to maintain an optimal torque applied to the spindle bearings.

In further embodiments, a combination of controlling the time-out period, the currents or voltages applied to the coil windings 63–65 and the commutation state sequence timing is applied to optimize startup of the spindle motor based on startup drive temperature determined from the VCM coil resistance. Such embodiments will combine the features based on desired design requirements. For instance if the currents used are at a maximum value and cannot be increased during startup, and the time-out period can only minimally be increased, a combination of increasing start-up time and adjusting commutation sequence timing can be used to optimize startup procedures.

In some circumstances, the spindle motor is shut down without parking the actuator on a ramp. Instead the heads land on the disk in a landing zone where data is not stored. During a contact startup operation, at power up of the disk drive, the head will still be in contact with the landing zone. A phenomenon known as "stiction" between the head and the landing zone is a potential problem in a contact start operation. Stiction resists separation between the head and disk surface and can be highly detrimental to disk drive operation. The stiction between the disk surface and the head can be so significant that a significant higher spindle motor torque is required to separate the head from the disk surface, than when the heads are parked on a ramp, or significantly more time is required for spin-up of the spindle motor. Without parking the heads, in accordance with the present invention, startup procedures may be altered to increase the time-out period or startup torque to account for the increased friction if the heads are not parked on a ramp, but instead remain in contact with the disk in combination with a lowered temperature.

Although the present invention is described for use with hard disk drives for recording in magnetic media, it is understood that principles in accordance with the present invention can be used with optical disk drives, or other types of magnetic disk drives such as floppy drives.

Although the present invention has been described above with particularity, this was merely to teach one of ordinary skill in the art how to make and use the invention. Many additional modifications will fall within the scope of the invention, as that scope is defined by the following claims.

What is claimed is:

1. A disk drive comprising:
   a rotatable disk;
   an actuator that supports a transducer;
   a voice control motor (VCM) including a coil winding configured to receive a signal to move the actuator so that the transducer is moved relative to the disk;
   a spindle motor having a plurality of windings and a rotor rotatable at an operating spin-rate during an operation mode of the disk drive;
   a spindle motor driver connected to apply winding currents across a combination of the spindle motor windings, and to receive a speed signal to enable measurement of spindle motor speed; and
   a processor coupled to the VCM to apply a signal to measure a resistance of the VCM coil winding and provide a temperature estimate based on the measured resistance, the processor further coupled to receive the speed signal enabling measurement of the spindle motor speed, the processor providing a signal to the spindle motor driver to turn off the spindle motor if the spindle motor speed has not reached the operating spin-rate after a period of time, wherein the period of time is increased with a decrease in the temperature estimate provided from the processor; and a spindle motor controller coupling the processor to the spindle motor driver, wherein the spindle motor driver applies the winding currents to generate torque on the rotor to cause movement of the spindle motor, and wherein the spindle motor controller provides a signal to control a magnitude of the winding currents applied to increase the torque during startup corresponding to the decrease in the temperature estimate provided from the processor.

2. The disk drive of claim 1, wherein the spindle motor controller is configured to identify a sequence of commutation states and send commutation voltage control signals to the spindle motor driver to apply voltages across a selected combination of the windings of the spindle motor to cause the sequence of commutation states resulting in torque on the rotor to cause a desired movement of the spindle motor, wherein the spindle motor controller further provides a series of commutation clock pulses to advance the spindle motor driver between commutation states, and wherein the spindle motor controller controls timing of the commutation clock pulses to increase the torque applied during startup corresponding to the decrease in the temperature estimate provided by the processor.

3. The disk drive of claim 1, wherein the signal applied to measure the resistance of the VCM coil winding is a set voltage, and the resistance is determined from the resulting current received from the VCM coil winding.

4. The disk drive of claim 1, wherein the signal applied to measure the resistance of the VCM coil winding is a set current, and the resistance is determined from the resulting voltage across the VCM coil winding.

5. The disk drive of claim 1, further comprising a memory connected with the processor, wherein processor readable code is stored in the memory the code being readable to cause the processor to apply the signal to measure the resistance of the VCM coil winding during startup, and to determine the temperature from a table of values stored in the memory with temperature corresponding to measured resistance.

6. The disk drive of claim 1, further comprising a memory connected with the processor, wherein processor readable code is stored in the memory the code being readable to the processor to apply the signal to measure the resistance of the VCM coil winding during startup, and to determine the temperature based on a calculation using the measured resistance.

7. A disk drive comprising:
a rotatable disk;
an actuator that supports a transducer;
a voice control motor (VCM) including a coil winding configured to receive a signal to move the actuator so that the transducer is moved relative to the disk;
a spindle motor having a plurality of windings and a rotor rotatable at an operating spin-rate during an operation mode of the disk drive;
a spindle motor driver connected to apply winding currents across a combination of the spindle motor windings, and to receive a speed signal to enable measurement of spindle motor speed; and
a processor coupled to the VCM to apply a signal to measure a resistance of the VCM coil winding and provide a temperature estimate based on the measured resistance, the processor further coupled to receive the speed signal enabling measurement of the spindle motor speed, the processor providing a signal to the spindle motor driver to turn off the spindle motor if the spindle motor speed has not reached the operating spin-rate after a period of time, wherein the period of time is increased with a decrease in the temperature estimate provided from the processor; and a spindle motor controller coupling the processor to the spindle motor driver, the spindle motor controller configured to identify a sequence of commutation states and send commutation voltage control signals to the spindle motor driver to apply voltages across a selected combination of the windings of the spindle motor to cause the sequence of commutation states resulting in torque on the rotor to cause a desired movement of the spindle motor, wherein the spindle motor controller further provides a series of commutation clock pulses to advance the spindle motor driver between commutation states, and wherein the spindle motor controller controls timing of the commutation clock pulses to increase the torque applied during startup corresponding to the decrease in the temperature estimate provided by the processor.

8. A disk drive comprising:
a rotatable disk;
a transducer;
an actuator that supports the transducer;
a voice control motor (VCM) connected to the actuator, the VCM including a coil winding configured to receive a signal to move the actuator so that the transducer is moved relative to the disk;
a processor coupled to the VCM to apply a signal to measure a resistance of the VCM coil winding, and to provide a temperature estimate based on the measured resistance;
a spindle motor having a plurality of windings and a rotor rotatable at an operating spin-rate during an operation mode of the disk drive;
a spindle motor driver connected to apply winding currents across a combination of the spindle motor windings; and
a spindle motor controller coupling the processor to the spindle motor driver, wherein the spindle motor driver applies the winding currents to generate torque on the rotor to cause movement of the spindle motor, and wherein the spindle motor controller provides a signal to control a magnitude of the winding voltages applied to increase the torque applied during startup corresponding to a decrease in the temperature estimate provided from the processor.

9. The disk drive of claim 8, wherein the spindle motor controller is configured to identify a sequence of commutation states and send a signal to the spindle motor driver to apply voltages across a selected combination of the windings of the spindle motor to cause the sequence of commutation states resulting in torque on the rotor to cause a desired movement of the spindle motor, wherein the spindle motor controller further provides a series of commutation clock pulses to advance the spindle motor driver between commutation states, and wherein the spindle motor controller controls timing of the commutation clock pulses to increase the torque applied during startup corresponding to the decrease in the temperature estimate provided by the processor.

10. A disk drive comprising:
a rotatable disk;
a transducer;
an actuator that supports the transducer;

a voice control motor (VCM) connected to the actuator, the VCM including a coil winding configured to receive a signal to move the actuator so that the transducer is moved relative to the disk;

a processor coupled to the VCM to apply a signal to measure a resistance of the VCM coil winding, and to provide a temperature estimate based on the measured resistance;

a spindle motor having a plurality of windings and a rotor rotatable at an operating spin-rate during an operation mode of the disk drive;

a spindle motor driver connected to apply winding voltages across a combination of the spindle motor windings; and a spindle motor controller coupling the processor to the spindle motor driver, the spindle motor controller configured to identify a sequence of commutation states and send a signal to the spindle motor driver to apply voltages across a selected combination of the windings of the spindle motor to cause the sequence of commutation states resulting in torque on the rotor to cause a desired movement of the spindle motor, wherein the spindle motor controller further provides a series of commutation clockpulses to advance the spindle motor driver between commutation states, and wherein the spindle motor controller controls timing of the commutation clock pulses to increase the torque applied during startup corresponding to a decrease in the temperature estimate provided by the processor.

* * * * *